United States Patent
He et al.

(10) Patent No.: US 7,705,514 B2
(45) Date of Patent: Apr. 27, 2010

(54) BI-DIRECTIONAL ACTUATOR UTILIZING BOTH ATTRACTIVE AND REPULSIVE ELECTROSTATIC FORCES

(76) Inventors: Siyuan He, Apt. 2106 30 Charles Street West, Toronto, Ontario (CA) M4Y 1R5; Ridha Ben Mrad, 12 Courtham Avenue, Thornhill, Onatrio (CA) L3T 1G3

( * ) Notice: Subject to any disclaimer, the term of this patent is extended or adjusted under 35 U.S.C. 154(b) by 543 days.

(21) Appl. No.: 11/249,628

(22) Filed: Oct. 14, 2005

(65) Prior Publication Data
US 2006/0082251 A1    Apr. 20, 2006

(51) Int. Cl.
H02N 1/00 (2006.01)
G02B 26/08 (2006.01)
(52) U.S. Cl. .............. 310/309; 359/225.1; 359/291; 318/116
(58) Field of Classification Search ........... 310/309; 359/223–226, 290, 291; 385/16, 18; 200/181; 318/116
See application file for complete search history.

(56) References Cited

U.S. PATENT DOCUMENTS

| | | | | |
|---|---|---|---|---|
| 5,541,465 | A * | 7/1996 | Higuchi et al. | 310/309 |
| 5,753,911 | A * | 5/1998 | Yasuda et al. | 850/1 |
| 6,303,885 | B1 * | 10/2001 | Hichwa et al. | 200/181 |
| 6,771,001 | B2 * | 8/2004 | Mao et al. | 310/309 |
| 6,792,804 | B2 * | 9/2004 | Adams et al. | 73/514.32 |
| 2003/0011955 | A1 * | 1/2003 | Murphy | 361/207 |
| 2003/0103717 | A1 * | 6/2003 | Aksyuk et al. | 385/18 |
| 2003/0117152 | A1 * | 6/2003 | Murphy | 324/661 |
| 2003/0203530 | A1 * | 10/2003 | Lee et al. | 438/72 |
| 2004/0160118 | A1 * | 8/2004 | Knollenberg et al. | 303/113.1 |
| 2006/0082251 | A1 * | 4/2006 | He et al. | 310/309 |

FOREIGN PATENT DOCUMENTS

| | | | |
|---|---|---|---|
| JP | 04-368479 | * | 12/1992 |
| JP | 08-186987 | * | 7/1996 |
| WO | 2007006154 | * | 1/2007 |

OTHER PUBLICATIONS

Translation of JP 04-368479, "electrostatic actuator", Suzuki et al. Dec. 21, 1992.*
Translation of JP 08-186987, "electrostatic actuator", suzuki et al., Jul. 16, 1996.*

* cited by examiner

*Primary Examiner*—Karl I Tamai
(74) *Attorney, Agent, or Firm*—Nasser Ashgriz

(57) ABSTRACT

An electrostatic actuator comprising: first and second comb arrays of electrodes arranged on a base, the electrodes of the first and second comb arrays being interleaved; a third comb array of electrodes spring mounted over the first and second comb arrays, the electrodes of the third comb array being essentially aligned with the electrodes of the second comb array; means for applying a first voltage to the third comb array and a second voltage to the first and second comb arrays to generate an attractive force acting on the third comb array to move the third comb array toward the second comb array; and, means for applying the first voltage to the second and third comb arrays and the second voltage to the first comb array to generate a repulsive force acting on the third comb array to move the third comb array away from the second comb array.

22 Claims, 17 Drawing Sheets

| Mode of Actuation | Voltage Applied at | | |
|---|---|---|---|
| | 60 | 64 | 66 |
| Attractive | V1 | V2 | V2 |
| Repulsive | V1 | V1 | V2 |

| Mode of Actuation | Voltage Applied at | | |
|---|---|---|---|
| | 60 | 64 | 66 |
| Attractive | V1 | V2 | V2 |
| Repulsive | V1 | V1 | V2 |

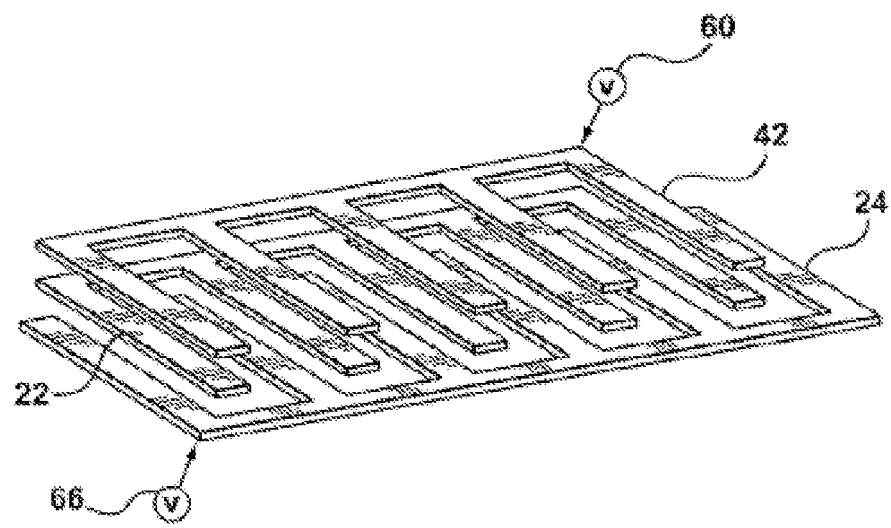
FIG. 9a
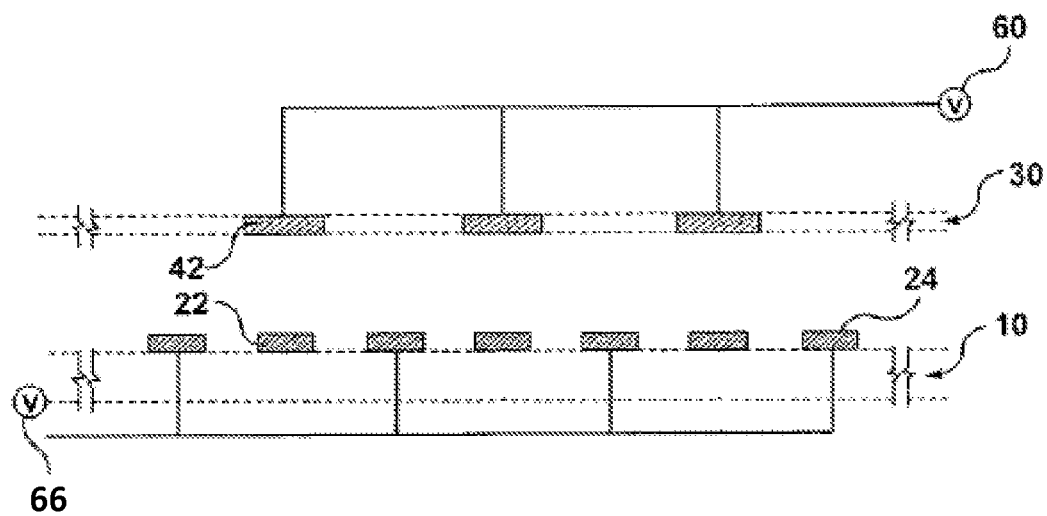
FIG. 9b
| Mode of Actuation | Voltage Applied at | |
|---|---|---|
| | 60 | 66 |
| Attractive | V1 | V2 |
FIG. 9c

| Mode of Actuation | Voltage Applied at | | |
|---|---|---|---|
| | 60 | 64 | 66 |
| Attractive | V1 | V2 | V1 |
| Repulsive | V1 | V1 | V2 |

90

▨ Fixed electrode    ▭ Moving electrode

90

▨ Fixed electrode    ▭ Moving electrode

BI-DIRECTIONAL ACTUATOR UTILIZING BOTH ATTRACTIVE AND REPULSIVE ELECTROSTATIC FORCES

FIELD OF THE INVENTION

The invention relates to the field of electrostatic actuators, and more particularly, to micro electrostatic actuators to be used in applications including optical MEMS devices, RF MEMS devices, and MEMS memory.

BACKGROUND OF THE INVENTION

Microelectromechanical systems (MEMS) are the integration of mechanical elements and electronics on the same chip using microfabrication technology similar to the IC process to realize high performance and low cost functional devices such as micro sensors and micro actuators.

MEMS is becoming an enabling technology in many fields as it enables the construction of devices or systems characterized by high performance, small size, small weight and low cost. Typical MEMS applications include: inertial measurement units such as micro accelerometers and micro gyroscopes; optical MEMS such as digital light processing (DLP) systems, micro optical switches and micromirrors for adaptive optics; and, RF MEMS devices such as micro RF switches, micro oscillators and micro varactors.

Micro actuators are important building blocks in constructing MEMS devices. There are four main actuation techniques used in MEMS, i.e., electrostatic, thermal, magnetic and piezoelectric. Among them, electrostatic actuation is the most used one because of its outstanding advantages such as low power consumption, simple structure, quick response, and especially high compatibility with IC fabrication technology. Micro electrostatic actuators can be categorized into two types, i.e., lateral (in-plane) actuators which move in the plane parallel to the substrate, and out-of-plane actuators which move in the plane perpendicular to the substrate. For lateral actuation or in-plane movement, combdrive types are preferred. The parallel-plate configuration is most suitable for vertical actuation or out-of-plane movement. Out-of-plane actuators are the subject of the present invention.

A conventional out-of-plane electrostatic actuator uses attractive electrostatic force and consists of two parallel plate electrodes: a fixed electrode and a moving electrode. The moving electrode is pulled down toward the fixed electrode by an attractive electrostatic force when a potential is applied between the two electrodes and it moves back to its original position due to a restoring force from supporting flexures when the voltage is removed.

The application of conventional parallel plate attractive electrostatic actuators is limited by the "pull-in" effect: when the displacement of the moving electrode exceeds ⅓ of the initial gap distance, the linear restoring force from the flexures cannot counteract the rapidly increasing nonlinear electrostatic attractive force between the fixed and moving electrodes, and as such the moving electrode sticks to the fixed electrode. A detailed explanation of the "pull-in" effect in conventional parallel-plate micro electrostatic actuators can be found in U.S. Pat. No. 5,753,911. Because of the "pull-in" effect the stroke of a conventional parallel-plate actuator is limited to less than one third of the initial gap distance between the fixed and moving electrodes.

Parallel-plate attractive micro electrostatic actuators are mainly fabricated by surface micromachining technology. In this technology, the initial gap distance between the fixed and moving electrodes is formed by a sacrificial layer such as silicon oxide, which is normally limited to a thickness of less than 2-3 micrometers. Therefore, the stroke of a conventional parallel-plate micro electrostatic actuator is limited to less than one micrometer (⅓ the thickness of the sacrificial layer).

In a number of MEMS applications, a stroke of the actuator as large as several micrometers is required. A significant effort has thus been dedicated to increase the stroke of the conventional parallel-plate electrostatic actuators. U.S. Patent Application Publication Nos. 2003/0103717 and 2004/0160118 present a method of using an elevation mechanism to raise the moving electrode to obtain a large initial gap between the fixed and moving electrodes, and therefore a larger stroke. By using the elevation mechanism a larger stroke is achieved at the price of increased fabrication complexity, lower space usage efficiency, lower production yield and higher driving voltage.

Another method to increase the stroke of conventional parallel plate attractive electrostatic actuators was disclosed in U.S. Patent Application Publication Nos. 2003/0011955 and U.S.2003/0117152. The method is based on using a special control circuit to realize a linear relation between the driving voltage and the gap distance, and therefore allows a large displacement. The largest stroke achieved by using this special control circuit is the full initial gap distance, which is normally limited in the range of 2-3 micrometers when standard surface micromachining is used to fabricate the parallel plate electrostatic actuator. Moreover, the special control circuit increases the cost of the chip.

Other methods were also developed to increase the stroke of the conventional parallel plate micro electrostatic actuators such as using second-order flexures (e.g., D. M. Burns and V. M. Bright, "Nonlinear flexures for stable deflection of an electrostatically actuated micromirror," Proc. SPIE Conf. Vol. 3226, 1997) and a dual-gap structure (e.g., J. Zou et al., "Development of a wide tuning range MEMS tunable capacitor for wireless communication systems," International Electron Devices Meeting, 2000).

All the attempts mentioned above to increase the stroke of the conventional parallel-plate attractive electrostatic actuators, are either not adequate to achieve a stroke large enough for many applications or are not compatible with standard surface micromachining technology and thus are difficult to implement in a batch-production process.

U.S. Pat. No. 5,541,465 discloses a design of special electrode arrangements for constructing cantilever actuators. This design has a serious drawback which limits it from being widely used as a bi-directional large stroke electrostatic actuator in MEMS devices, namely, the moving electrodes require electric potentials with opposite polarities thereby a movable insulation layer, such as silicon nitride or silicon oxide, has to be added to physically constrain and electrically insulate all the moving electrodes. These requirements complicate the fabrication process, lead to a deterioration of the performance of the component, and add wiring complexity. Moreover, no moving insulation layer is available in many commercial MEMS fabrication processes such as MUMPS (Multi User MEMS Processes), SUMMIT (Sandia Ultra planar Multilevel MEMS Technology), and so on.

An electrostatic actuator utilizing both attractive and repulsive forces can provide bi-directional movement of the electrodes. The total stroke of such a bi-directional electrostatic actuator includes two parts, i.e., the displacement of the moving electrode in the direction toward the fixed electrode and that in the direction away from the fixed electrode. Therefore the stroke is not limited by the initial gap distance. Hence, a large stroke can be achieved by the bi-directional electrostatic actuator. Bi-directional electrostatic actuator can separate sticking surfaces, thereby is able to make reprogrammable MEMS nonvolatile memory.

A bi-directional electrostatic actuator of the comb-drive type has been disclosed and is the subject of U.S. Pat. No. 6,771,001. As is common with the comb-drive configuration, the disclosed device provides large in-plane motion while minimizing out-of-plane motion.

A need, therefore, exists for an improved electrostatic actuator. Consequently, it is an object of the present invention to obviate or mitigate at least some of the above mentioned disadvantages.

SUMMARY OF THE INVENTION

In accordance with one aspect of the present invention, there is provided a method of operating an electrostatic actuator comprising the steps of: providing a base containing a plurality of electrodes; providing a movable element being movably connected to the base, the moveable element including a plurality of electrodes, one or more of the plurality of electrodes having a corresponding aligned electrode on the base, and each aligned electrode on the base being disposed adjacent to at least one non-aligned electrode disposed on the base; and generating one, or both at different intervals, of: a repulsive electrostatic force by applying a voltage of V1 to the electrodes on the movable element, V1 to the aligned electrodes on the base and V2 to the non-aligned electrodes on the base; and/or an attractive electrostatic force by applying a voltage of V1 to the electrodes on the moveable element, and V2 to the aligned and non-aligned electrodes on the base. In accordance with another aspect of the invention, a method is provided for electrostatic actuation in a micro-electro-mechanical system, related to the aforesaid method.

In accordance with another aspect of the present invention, there is provided an electrostatic actuator comprising: a base containing a plurality of electrodes; a movable element being movably connected to the base, the moveable element including a plurality of electrodes, one or more of the plurality of electrodes having a corresponding, aligned electrode on the base, and each aligned electrode on the base being disposed adjacent to at least one non-aligned electrode disposed on the base; and a means for applying voltage to the electrostatic actuator, said means being operable to generate one, or both at different intervals, of: a repulsive electrostatic force by applying a voltage of V1 to the electrodes on the movable element, V1 to the aligned electrodes on the base and V2 to the non-aligned electrodes on the base; or an attractive electrostatic force by applying a voltage of V1 to the electrodes on the moveable element, and V2 to the aligned and non-aligned electrodes on the base.

In yet another aspect of the present invention, a micro-electro-mechanical system is provided that includes at least one of the aforesaid electrostatic actuators.

The present invention provides an electrostatic actuator having a large stroke out-of-plane motion achieved through a bi-directional capability and through a combined attractive-repulsive principle of operation. Advantageously, the present invention can be fabricated by mature standard surface micromachining technology.

In particular, the invention provides a repulsive electrostatic actuator by arranging electrodes to generate, when a repulsive force is desired, an asymmetric field around the moving electrodes leading to a net repulsive force. Moreover, the invention provides a bi-directional electrostatic actuator which combines both attractive and repulsive forces to drive the moving electrodes toward and away from the fixed electrodes, thereby increasing the total stroke of conventional parallel plate attractive electrostatic actuators. The invention relies on a special arrangement of electrodes whereby the moving electrodes are subject to either an attractive or a repulsive force depending on the voltage applied. In general, the invention provides a bi-directional electrostatic actuator with a simple structure, e.g., only two conductive layers are needed such that it can be easily incorporated with MEMS devices without adding extra fabrication complexity and is compatible with standard surface micromachining technology.

According to one particular aspect of the invention, there is provided in one embodiment of the invention a bi-directional actuator comprising two arrays of electrodes: one array of moving electrodes positioned opposite another array of fixed electrodes. Each moving electrode has, in accordance with this embodiment, a corresponding and aligned fixed electrode. Each fixed electrode has two "adjacent" fixed electrode not aligned with a moving electrode, in accordance with this particular embodiment. The adjacent electrodes are in the same plane as the fixed electrodes. In general, the number of fixed electrodes is 2n+1 where n is the number of moving electrodes. Voltages can be applied in different ways as follows: 1) when a voltage V1 is supplied to the moving electrodes and a voltage V2 is supplied to all the fixed electrodes, where V1[[=]]≠V2, an attractive force is generated to move the moving electrodes towards the fixed electrodes; 2) when the moving electrodes and their corresponding aligned fixed electrodes are supplied with a voltage V1, and the adjacent fixed electrodes are supplied with a voltage V2, a repulsive force is generated to move the moving electrodes away from the fixed electrodes; and, 3) when a voltage V1 is supplied to the moving electrodes and a voltage of V2 is supplied to all the "adjacent" fixed electrodes, which are not aligned with any moving electrodes, an attractive force is generated to move the moving electrodes towards the fixed electrodes if all the moving electrodes are wider than the aligned fixed electrodes.

In accordance with a particular embodiment of the invention, the adjacent fixed electrodes are elevated through support posts to be in the same plane as the moving electrodes when no voltage is applied. When the moving electrodes and the elevated adjacent fixed electrodes are supplied with a voltage V1, and the aligned fixed electrodes are supplied with a voltage V2, where V1≠[ ]V2, an attractive force is generated to move the moving electrodes towards the aligned fixed electrodes. When the aligned electrodes in both arrays are supplied with a voltage V1, and the elevated unaligned adjacent fixed electrodes are supplied with V2, a repulsive force is generated to move the moving electrodes away from the fixed electrodes. Preferably, the moving electrodes are only subject to a single voltage, thereby eliminating any requirement for additional insulating layers on the moveable element or any wiring complexity. Preferably, the moveable element has only two structural layers.

Advantageously, the bi-directional large-stroke electrostatic actuator of the present invention can be implemented with standard surface micromachining techniques and easily incorporated into MEMS devices such as optical switches, RF switches, tunable capacitors, micromirrors, micro gyroscopes, and the like.

According to another particular aspect of the invention, there is provided an electrostatic actuator comprising: first and second comb arrays of electrodes arranged on a base, the electrodes of the first and second comb arrays being interleaved; a third comb array of electrodes spring mounted over the first and second comb arrays, the electrodes of the third comb array being essentially aligned with the electrodes of the second comb array; and, means for applying a first voltage to the third comb array and a second voltage to the first and second comb arrays to generate an attractive force acting on the third comb array to move the third comb array toward the second comb array.

Preferably, the means is adapted for applying the first voltage to the second and third comb arrays and the second voltage to the first comb array to generate a repulsive force acting on the third comb array to move the third comb array away from the second comb array.

Preferably, the means is adapted for applying the first voltage to the third comb array and the second voltage to the first comb array to generate an attractive force acting on the third comb array to move the third comb array toward the second comb array.

Preferably, the electrostatic actuator further includes posts for elevating the electrodes of the first comb array with respect to the electrodes of the second comb array. Preferably, the electrodes of the first and third comb arrays are coplanar.

Preferably, the third comb array is at least one of translatable and rotatable with respect to the first and second comb arrays. Preferably, the electrostatic actuator further includes a spacing material between the third comb array and first and second comb arrays, wherein the spacing material is one of a vacuum and a fluid. Preferably, the electrodes are one of straight and curved. Preferably, the electrodes have one of equal and unequal widths. Preferably, the electrodes have a width that is larger than a height of the electrodes. Preferably, a distance between the electrodes of the third comb array and the electrodes of the first and second comb arrays is zero.

BRIEF DESCRIPTION OF THE DRAWINGS

Embodiments of the invention may best be understood by referring to the following description and accompanying drawings. In the description and drawings, like numerals refer to like structures or processes. In the drawings:

FIG. 9(a) is a perspective view illustrating the electrical connection of the electrodes of the actuator of FIG. 1 for operation as a "unidirectional large stroke attractive actuator" having a stroke of the full initial gap, in accordance with an embodiment of the invention;

FIG. 9 (b) is a section view illustrating the electrodes of the actuator of FIG. 1 for operation as a "unidirectional large stroke attractive actuator" having a stroke of the full initial gap, in accordance with an embodiment of the invention;

FIG. 9(c) is a table illustrating the mode of actuation of the actuator of FIG. 1 when operating as a "unidirectional large stroke attractive actuator" having a stroke of the full initial gap, in accordance with an embodiment of the invention;

FIG. 17 (b) is a table illustrating the mode of actuation of the bi-directional electrostatic actuator of FIG. 15 as a function of voltage applied to the various sets of electrodes, in accordance with an embodiment of the invention;

FIG. 23 (*b*) is a section view illustrating the electrodes in the bi-directional electrostatic actuator of FIG. 15 where the aligned fixed electrodes have more than one adjacent unaligned fixed electrode on each side and where the number of unaligned fixed electrodes could be equal to or larger than 1, in accordance with an embodiment of the invention;

FIG. 23(*c*) is a section view illustrating the electrodes in the bi-directional electrostatic actuator of FIG. 15 where electrodes in the moving array are essentially but not completely aligned with corresponding electrodes in the fixed array, in accordance with an embodiment of the invention;

FIG. 24(*b*) is a perspective view illustrating a translation micromirror driven by the bi-directional electrostatic actuator of FIG. 15 in accordance with an embodiment of the invention;

FIG. 25 (*b*) is a perspective view illustrating a RF switch (or RF varactor) driven by the bi-directional electrostatic actuator of FIG. 15 in accordance with an embodiment of invention;

FIG. 26(*b*) is a perspective view illustrating a rotary micromirror driven by the bidirectional electrostatic actuator of FIG. 15 in accordance with an embodiment of the invention;

DETAILED DESCRIPTION OF THE PREFERRED EMBODIMENTS

In the following description, numerous specific details are set forth to provide a thorough understanding of the invention. However, it is understood that the invention may be practiced without these specific details. In other instances, well-known structures and techniques have not been described or shown in detail in order not to obscure the invention.

The inventors of the present invention have conducted theoretical analysis and developed an analytical model to optimize parallel-plate actuator displacement as a function of applied voltage. (S. He and R. Ben Mrad, "A Novel Large Stroke Micro Electrostatic Actuator for Vertical Translation of Micromirrors Used in Adaptive Optics," IEEE Transactions on Industrial Electronics—Special Issue on OptoMechatronics, Vol. 52, No. 4, August 2005, pp. 974-983; S. He and R. Ben Mrad, "A Novel MEMS Tunable Capacitor," International Conference on MEMS, NANO and Smart Systems, Aug. 25-27, 2004, Banff, Alberta). The theoretical basis is that through electrode configuration, an asymmetric field around the moving electrodes can be generated to provide either a net repulsive force or a net attractive force while all the moving electrodes are subject to the same potential. Through their analysis, they have discovered that simple structures can be fabricated using conventional IC processes and microfabrication technology, to combine a repulsive force with an attractive force to provide electrostatic actuators with bi-directional movement that significantly improve their stroke.

The present invention provides for a large stroke bi-directional electrostatic actuator which can be fabricated with conventional surface machining fabrication technology.

Advantageously, the present invention provides actuators having a simple structure without complexities arising from special wiring and voltage control circuitry.

Figure 1:
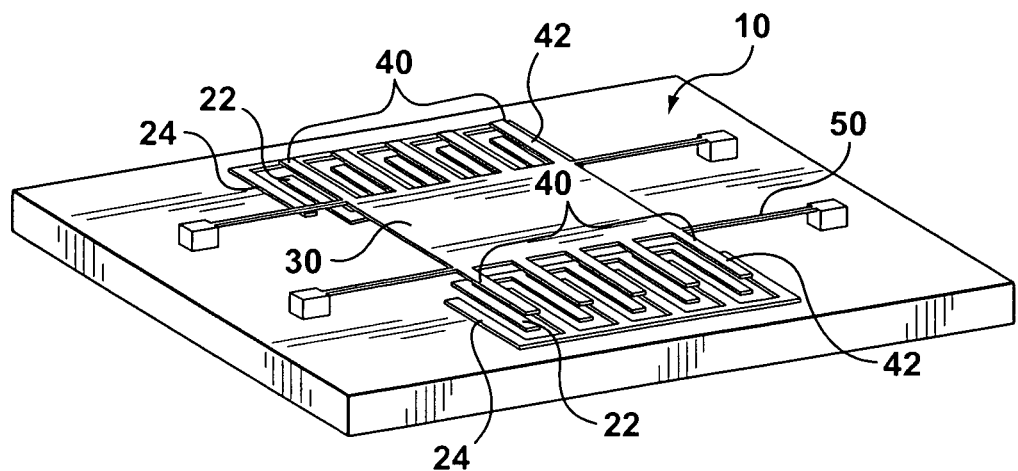
FIG. 1 is a perspective view illustrating a bi-directional electrostatic actuator in accordance with an embodiment of the invention.
Figure 2:
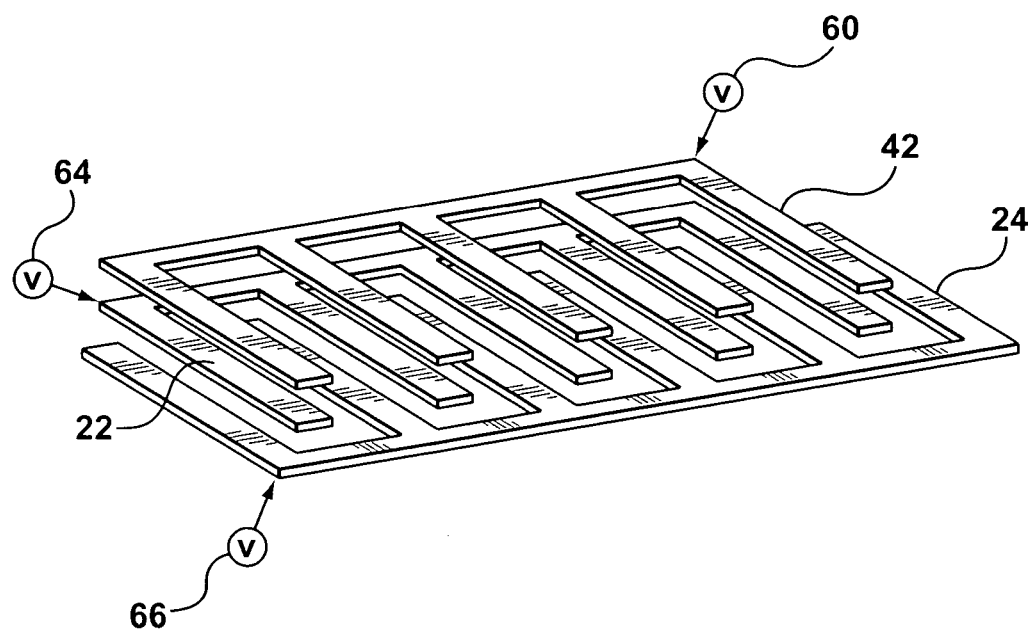
FIG. 2 is a perspective view illustrating the electrical connection of the electrodes of the actuator of FIG. 1 in accordance with an embodiment of the invention.

The present invention may be better understood with references to FIGS. 1 and 2.

FIG. 1 schematically illustrates the simplest form of an actuator in accordance with the invention, in accordance with one particular embodiment thereof. A base 10 contains an array of electrodes (also known as fixed electrodes) and a movable element 30 containing an array of electrodes 42 (also known as moving electrodes) is connected via springs 50 to the base 10. Each moving electrode 42 has a corresponding and aligned fixed electrode 22 on the base 10. Each aligned fixed electrode 22 has an adjacent electrode 24 which is unaligned with any moving electrode and located between two fixed aligned electrodes.

The springs 50 are flexible in the direction perpendicular to the plane of the moving electrodes 42 and are very stiff in other directions, such that the moving electrodes 42 can essentially move only in the out-of-plane direction.

Figures 3, 4:
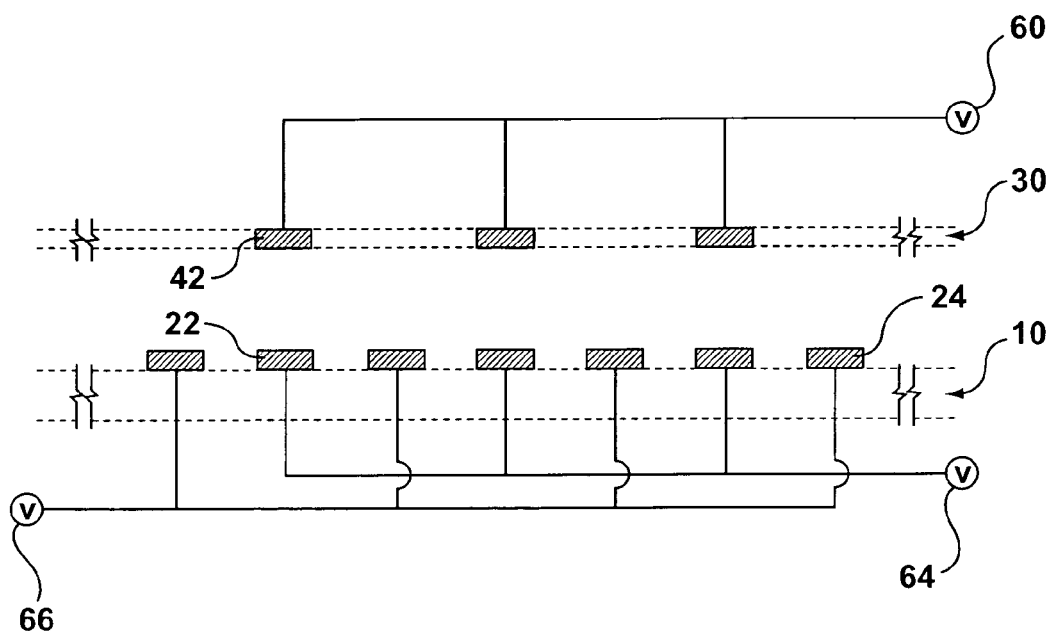
FIG. 3 is a section view illustrating the actuator of FIG. 1 in accordance with an embodiment of the invention.
FIG. 4 is a table illustrating modes of actuation of the bi-directional electrostatic actuator of FIG. 1 as a function of voltage applied to the various sets of electrodes, in accordance with an embodiment of the invention.

In a working actuator the electrodes are electrically connected as shown in FIG. 2. FIG. 3 only shows part of the electrodes in the actuator as shown in FIG. 1. The moving electrodes 42 are electrically connected to a voltage source 60, the aligned fixed electrodes 22 on the base 10 are electrically connected to a voltage source 64, and the non-aligned fixed adjacent electrodes 24 are electrically connected to a voltage source 66.

The preferred embodiments of the invention may now be illustrated by reference to the specific examples provided as Example 1 and Example 2. Clearly, other embodiments are also within the scope of this invention, but references to the preferred embodiments facilitate an explanation of the various aspects of the invention.

EXAMPLE 1

The bi-directional electrostatic actuator of this example is schematically shown as FIG. 1. FIG. 2 shows part of the electrodes of the actuator shown in FIG. 1—The section view of electrodes is shown as FIG. 3. The width of the moving electrodes 42 and that of the fixed electrodes 22, 24 are not necessarily equal. Normally, the moving electrodes 42 are slightly narrower than the aligned fixed electrodes 22 in order to accommodate for any undesired displacement during operation and for misalignments due to fabrication in the plane parallel to the plane of the electrodes. The minimum number of moving electrodes 42 is 1 and the minimum number of fixed electrodes 22, 24 is 3. There is no limitation on the maximum number of moving and fixed electrodes.

All the electrodes are made of electrically conductive material. As shown in FIG. 3, all moving electrodes 42 in the actuator are electrically connected to a voltage source 60. Aligned fixed electrodes 22 on the base 10 are electrically connected to voltage source 64. Unaligned fixed adjacent electrodes 24 are connected and subject to voltage source 66.

The bi-directional electrostatic actuator of this example can work in two modes, i.e., the attractive mode and the repulsive mode. When working in the attractive mode, the electrodes are subject to potentials in the manner shown in FIG. 4: all the moving electrodes 42 are supplied with a voltage V1 at 60 and all the electrodes 22, 24 on the base 10 are supplied with a voltage V2 at 64, 66, where V1≠V2. A resultant attractive force is generated to drive the moving electrodes 42 towards the fixed electrodes 22 and 24 on the base 10. When working in the repulsive mode, the electrodes are supplied with voltages as follows: all the moving electrodes 42 and the aligned fixed electrodes 22 on the base 10 are subject to a voltage V1 at 60 and 64.

The remaining unaligned fixed adjacent electrodes 24 are subject to a voltage V2 at 66. A resultant repulsive force is generated to drive the moving electrodes 42 away from the fixed electrodes 22, 24 on the base 10.

The actuator of this example has the following structural parameters: thickness of all electrodes 1 micrometer, width of moving electrodes 5 micrometers, width of fixed moving electrodes 8 micrometers, and distance between two neighboring fixed electrodes 8 micrometers.

Figure 5:
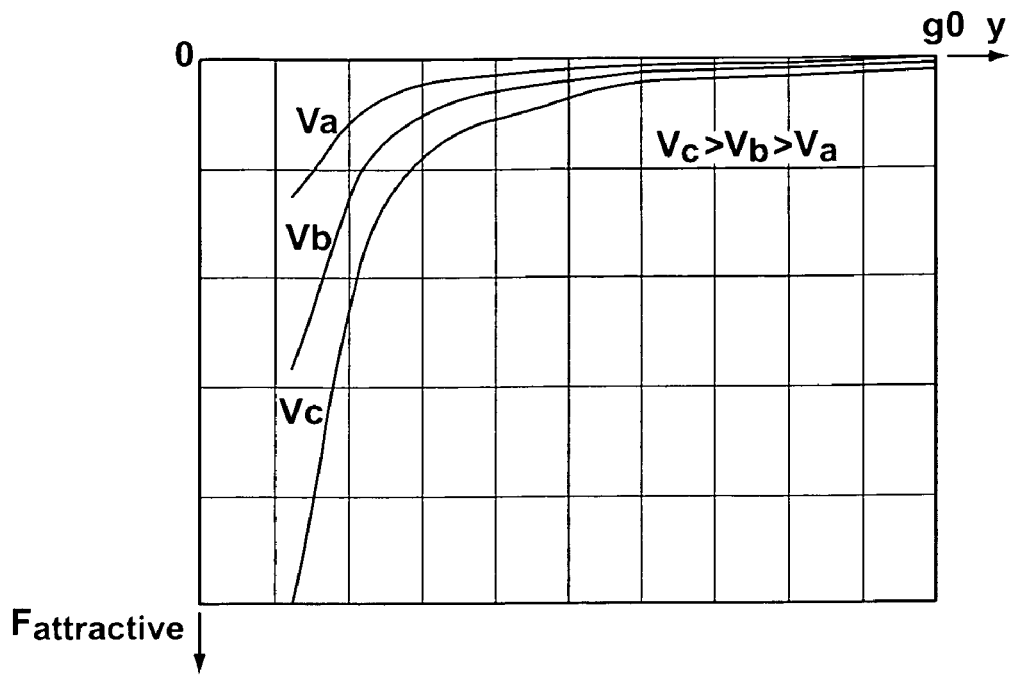
FIG. 5 is a graph illustrating the attractive force generated in the bi-directional actuator of FIG. 1.

The attractive force generated in the bi-directional actuator of this example is shown in FIG. 5. FIG. 5 is calculated using a commercially available numerical simulation software package named Maxwell®. g0 is the initial gap distance between the fixed 22, 24 and moving 42 electrodes. y represents the distance between the fixed and moving electrodes when the actuator is in operation.

Figure 6:
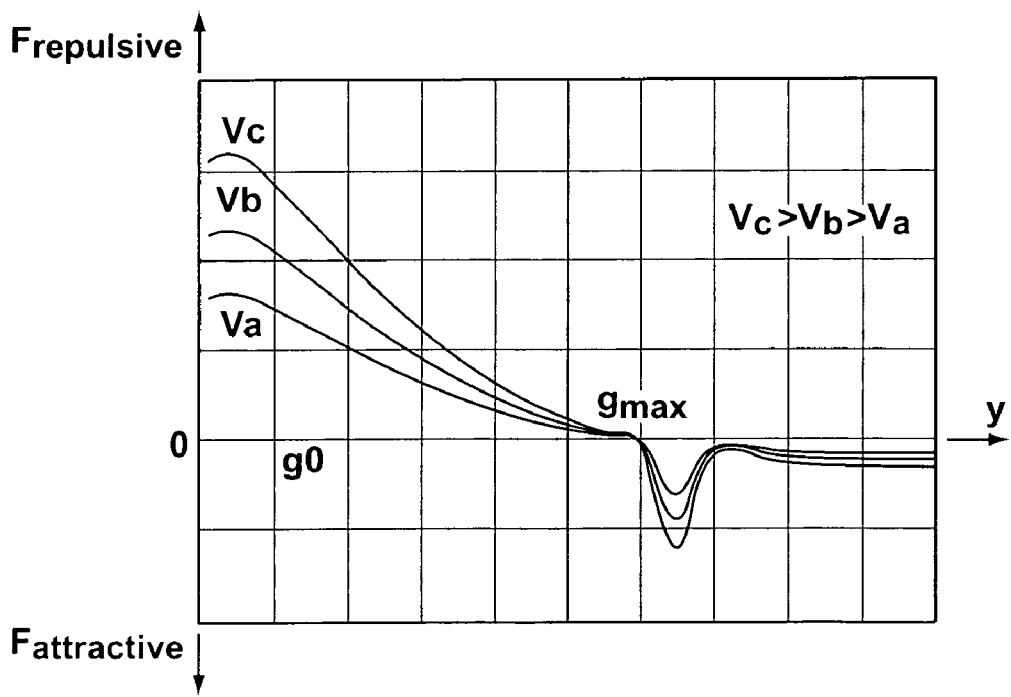
FIG. 6 is a graph illustrating the repulsive force produced in the bi-directional actuator of FIG. 1.

The repulsive force generated in the bi-directional actuator of this example is shown in FIG. 6 which is also obtained from numerical simulations using the software package Maxwell®. When working in the repulsive mode the actuator of this example can produce a repulsive force over a very large range of the distance between the fixed and moving electrodes, i.e., 0-g_max. g_max is the maximum distance between the fixed and moving electrodes, within which the bi-directional actuator can generate a repulsive force. g_max is much larger than the initial gap distance g0. That means the bi-directional actuator of this example working under the repulsive mode can achieve a stroke much larger than the initial gap distance. g_max is determined by structural parameters of the actuator. In this example, g_max is 12 micrometers.

Figure 7:
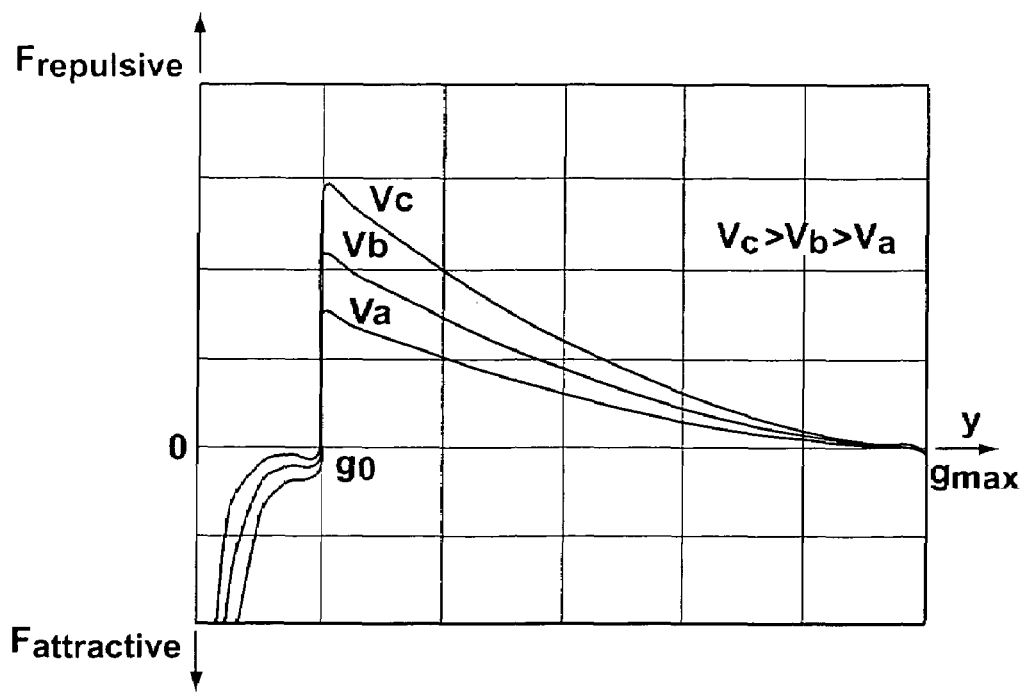
FIG. 7 is a graph illustrating the total force produced in the bi-directional electrostatic actuator of FIG. 1 during bidirectional operation.
Figure 8:
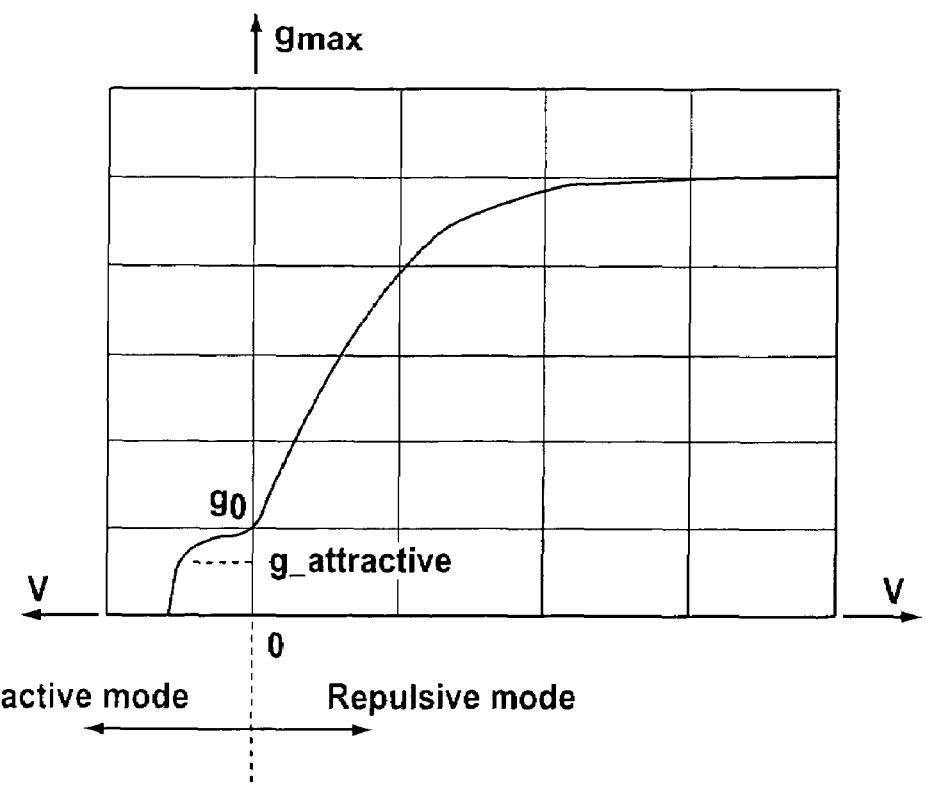
FIG. 8 is a graph illustrating the displacement of the bi-directional electrostatic actuator of FIG. 1 during bi-directional operation.

One method of using this electrostatic actuator is in a bidirectional mode of operation. That is, by applying a voltage to the actuator in the attractive mode as shown in FIG. 5 to move the moving electrodes from its static position toward the fixed electrodes and by applying a voltage in the repulsive mode as shown in FIG. 6 to move the moving electrodes from its static position away from the fixed electrodes. FIG. 7 shows the force produced in the bi-directional actuator of this example when operated in both the attractive and repulsive modes. FIG. 8 shows the total stroke as g_attractive+g_max. g_attractive is the stroke achieved when working in the attractive mode and is about ⅓ g0.

The bi-directional electrostatic actuator of this example can also function as a unidirectional actuator. The actuator of this example working in the attractive mode can produce a stroke of ⅓ g0. In the repulsive mode it can produce a stroke of g_max.

The actuator of this example can work as a "unidirectional large stroke attractive actuator" having a stroke of the full initial gap if all the moving electrodes 42 are wider than the aligned fixed electrodes 22 and only the moving electrodes 42 and unaligned "adjacent" fixed electrodes are connected to voltage sources, as shown in FIG. 9 (a), FIG. 9 (b) and FIG. 9(c) where: all moving electrodes 42 are connected to a voltage source 60, V1 and all unaligned "adjacent" fixed electrodes 24 are connected to a voltage source of 66, V2.

The nonlinearity of the attractive electrostatic force produced in the electrostatic actuator of the present invention working as a "unidirectional large stroke attractive actuator" is significantly decreased compared to conventional parallel plate actuators. The attractive force in the "unidirectional large stroke attractive actuator" is numerically calculated by the software Maxwell and is shown in FIG. 7. The actuator has the following structural parameters: thickness of all electrodes 1 micrometer, width of moving electrodes 5 micrometers, width of fixed moving electrodes 3 micrometers, and distance between two neighboring fixed electrodes 3 micrometers.

Figure 10:
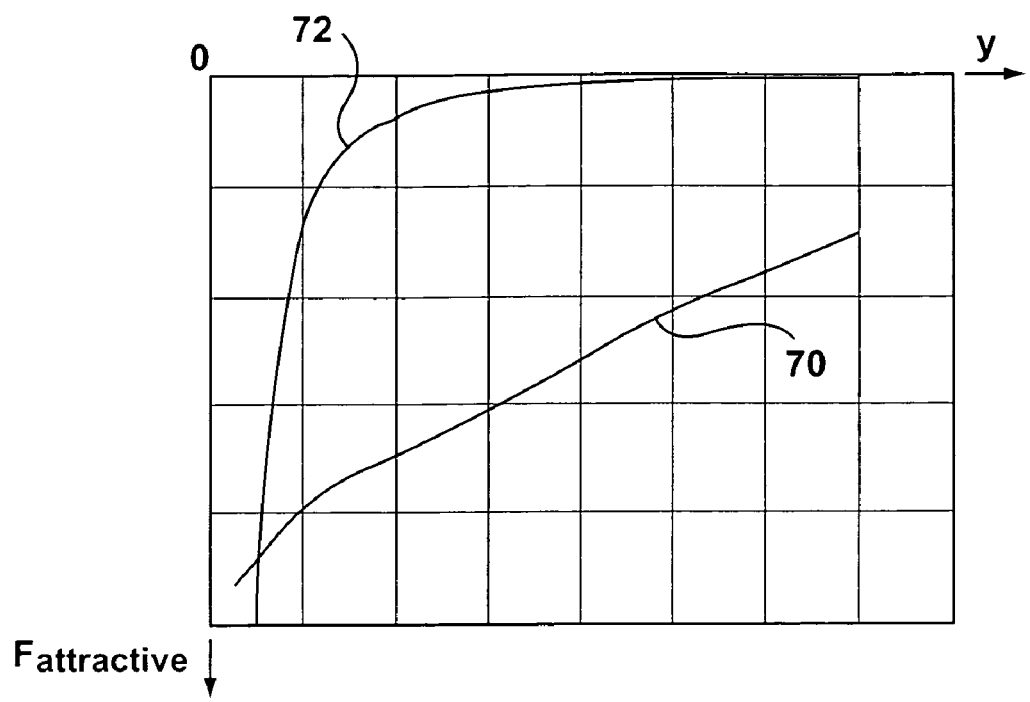
FIG. 10 is a graph illustrating the relationship between the attractive force versus the gap distance of the actuator of FIG. 1 when operating as a "unidirectional large stroke attractive actuator" having a stroke of the full initial gap.

In FIG. 10 the curve 72 is the attractive force produced by a conventional parallel plate actuator and the curve 70 is the attractive force produced in the actuator of the present invention working as a "unidirectional large stroke attractive actuator".

Figure 11:
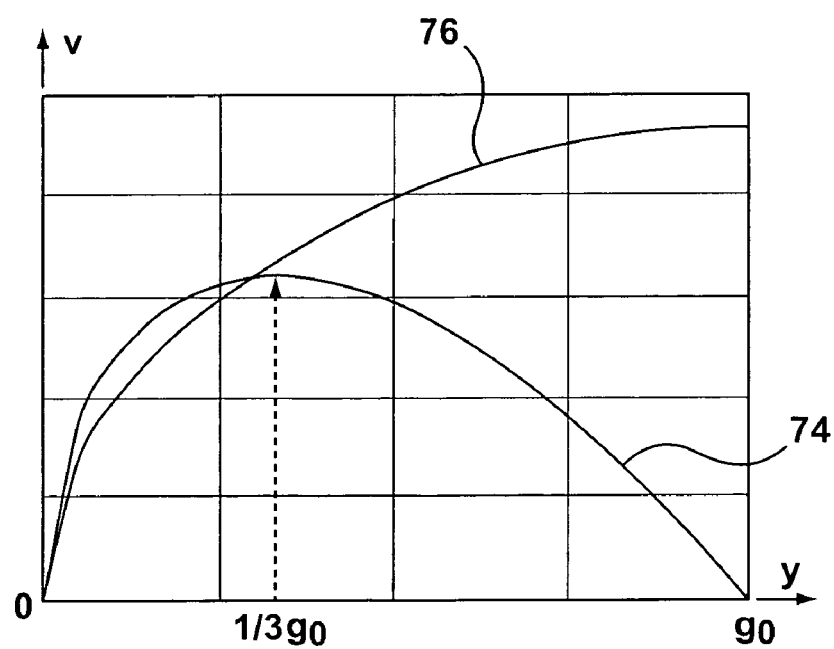
FIG. 11 is a graph illustrating the relationship between the driving voltage versus the gap distance of the actuator of FIG. 1 when operating as a "unidirectional large stroke attractive actuator" having a stroke of the full initial gap.

FIG. 11 shows relations of voltage versus displacement in conventional parallel plate actuator, i.e., curve 74 and in the "unidirectional large stroke attractive actuator", i.e., curve 76. FIG. 11 shows that conventional parallel plate actuator can only achieve a stroke of ⅓ the initial gap distance g0 while the "unidirectional large stroke attractive actuator" can achieve a stroke of full gap distance.

Figure 12:
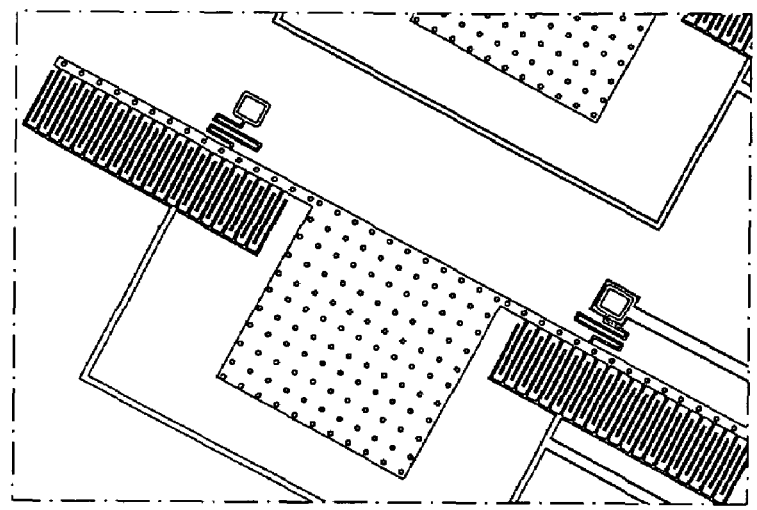
FIG. 12 is a top view illustrating a prototype of a micromirror driven by the electrostatic actuator of FIG. 1 in accordance with an embodiment of the invention.
Figure 13:
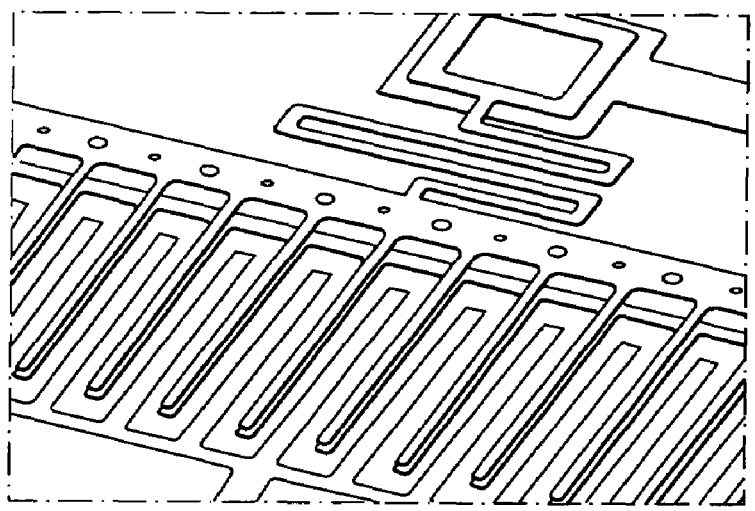
FIG. 13 is a top view illustrating the electrodes of the micromirror of FIG. 12 in accordance with an embodiment of the invention.
Figure 14:
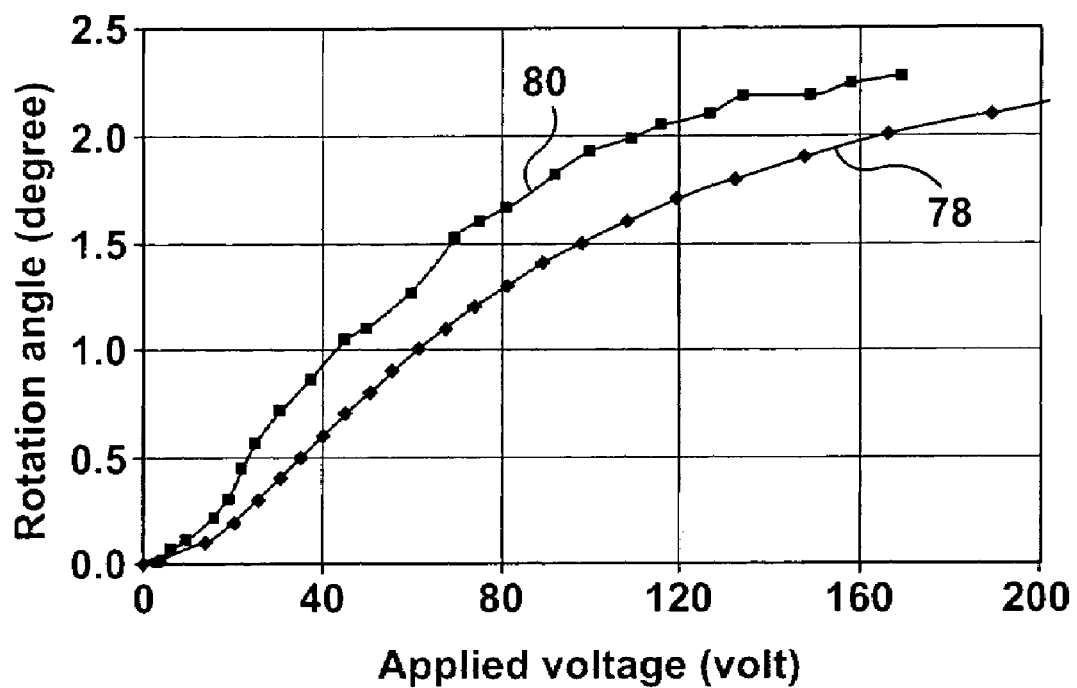
FIG. 14 is a graph illustrating numerical simulation results and experimental measurement results for micromirror of FIG. 12.

Prototypes were fabricated to experimentally verify operation of the bi-directional electrostatic actuator of the present invention. FIGS. 12 and 13 show prototypes of a rotary micromirror actuated by the electrostatic actuator of the present invention. FIG. 14 shows both the numerical simulation result 78 by the Maxwell® software package and the experimental measurement results 80. The parameters of the rotary micromirror prototype driven by the micro electrostatic actuator are: minor size 300 μm×300 μm, number of moving fingers 40, moving finger width 3 μm, fixed finger width 5 μm, distance between two fixed fingers 5 μm, finger length 70 μm. The micromirror driven by the novel actuator can achieve a rotation of 2.25 degrees while a surface micromachined micromirror of the same size driven by conventional attractive parallel plate actuator can only achieve a rotation of 0.1-0.2 degree.

EXAMPLE 2

Figure 15:
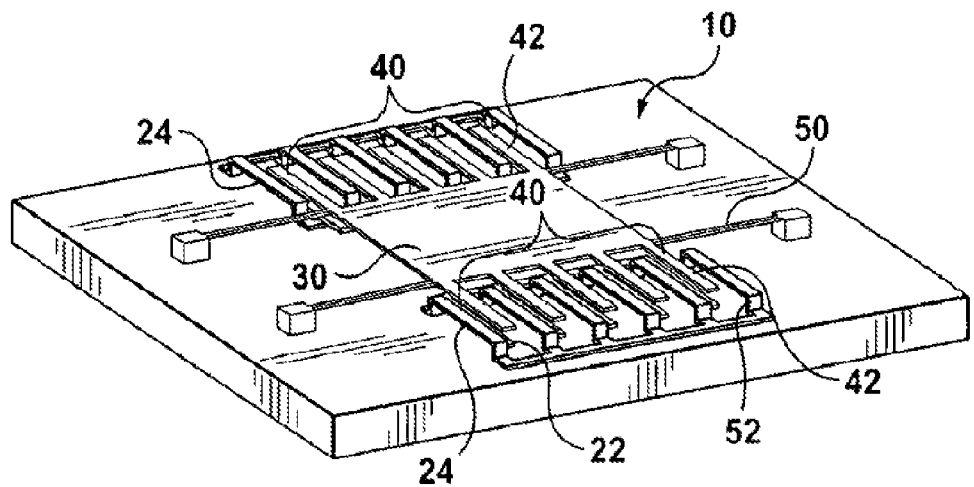
FIG. 15 is a perspective view illustrating a second bidirectional electrostatic actuator in accordance with an embodiment of the invention.
Figure 16:
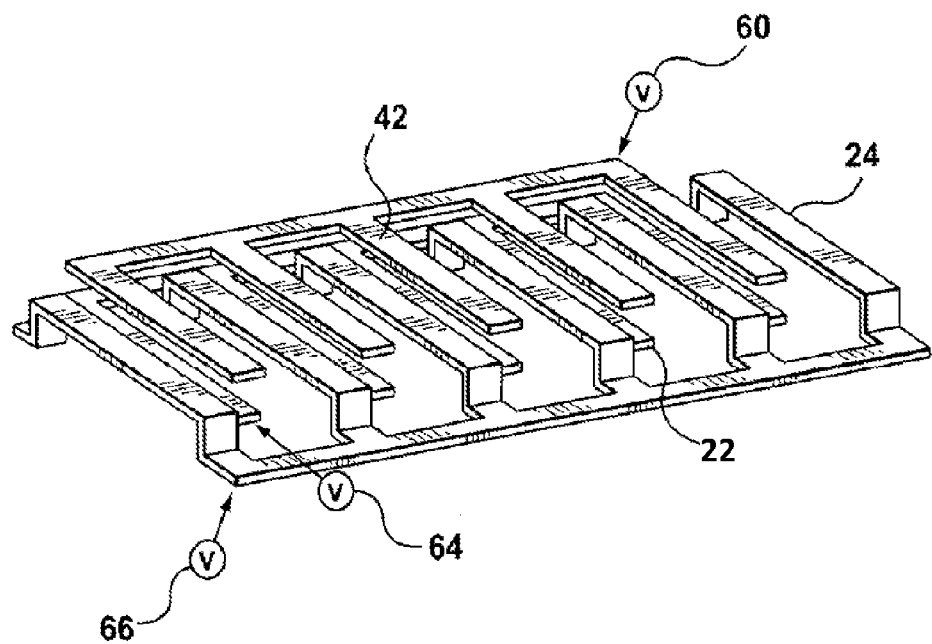
FIG. 16 is a perspective view illustrating the electric connections within the bi-directional electrostatic actuator of FIG. 15 in accordance with an embodiment of the invention.
Figures 17A, 17B:
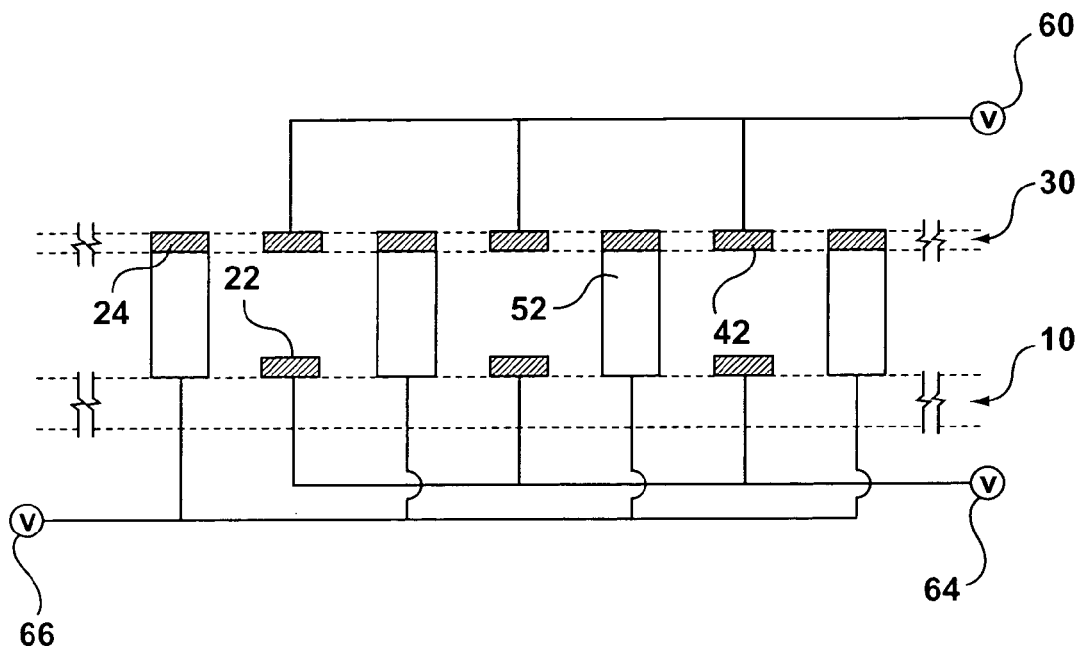
FIG. 17 (a) is a section view illustrating the electrodes in the bi-directional electrostatic actuator of FIG. 15 in accordance with an embodiment of the invention.

The bi-directional electrostatic actuator of this example is schematically shown in FIG. 15. FIG. 16 shows part of the electrodes of the actuator shown in FIG. 15. A section view of the electrodes is shown in FIG. 17(a).

As shown in FIG. 15, the moving electrodes 42 have a set of aligned fixed electrodes 22 on the base 10. The unaligned fixed adjacent electrodes 24 are elevated to the same plane as the moving electrodes 42 by supporting posts 52.

As shown in FIGS. 16 and 17 (a), all moving electrodes 42 in the actuator are electrically connected to a voltage source 60. Aligned fixed electrodes 22 on the base 10 are electrically connected to voltage source 64. Unaligned fixed adjacent electrodes 24 are connected and subject to voltage source 66.

The bi-directional electrostatic actuator of this example can work in two modes, i.e., the attractive mode and the repulsive mode. When working in the attractive mode, the electrodes are subject to potentials in the manner shown in FIGS. 17(a) and 17(b): all the moving electrodes 42 are supplied with a voltage V1 at 60, all the aligned fixed electrodes 22 on the base 10 are supplied with a voltage V2 at 64, and all the elevated unaligned fixed electrodes 24 are supplied with a voltage V1 at 66, where V1≠V2. A resultant attractive force is generated to drive the moving electrodes 42 towards the fixed aligned electrodes 22 on the base 10. When working in the repulsive mode, the electrodes are supplied with voltages as follows: all the moving electrodes 42 and the aligned fixed electrodes 22 on the base 10 are subject to a voltage V1 at 60, 64. The remaining unaligned fixed adjacent electrodes 24 are subject to a voltage V2 at 66. A resultant repulsive force is generated to drive the moving electrodes 42 away from the aligned fixed electrodes 22 on the base 10.

Figure 18:
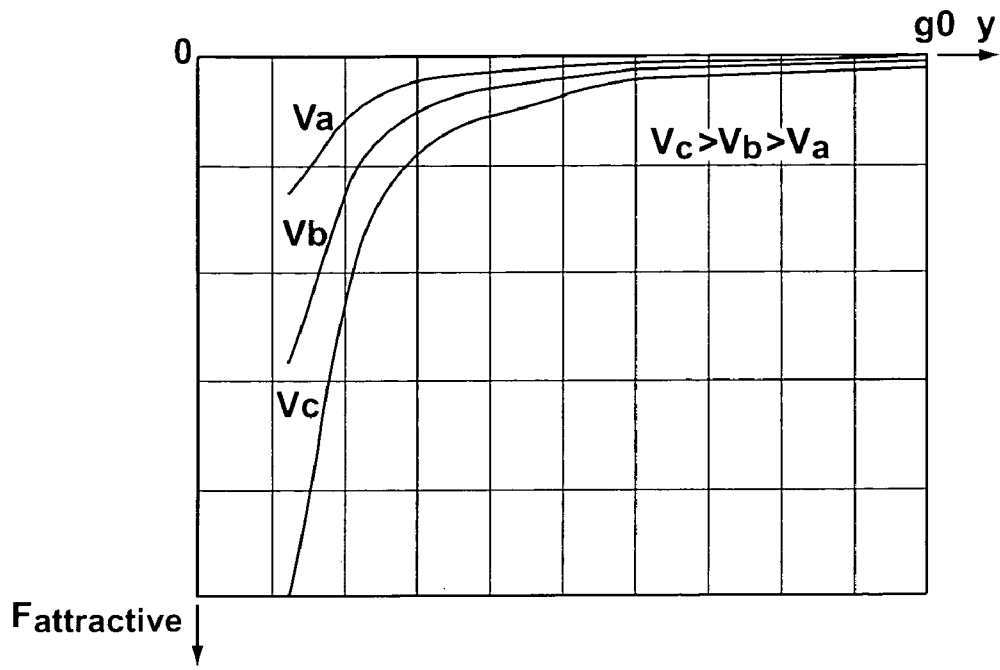
FIG. 18 is a graph illustrating the attractive force produced in the bi-directional electrostatic actuator of FIG. 15.

The structural parameters of the bidirectional actuator of this example are as follows: thickness of all electrodes 1 micrometer, initial gap distance 2 micrometers, width of moving electrodes 5 micrometers, width of fixed moving electrodes 8 micrometers, and distance between two adjacent fixed electrodes 8 micrometers. [0095] The attractive force generated in the bidirectional actuator of this example is shown in FIG. 18. g0 is the initial gap distance between the aligned fixed electrodes 22 and the moving electrodes 42. y represents the distance between the aligned fixed electrodes on the base 10 and the moving electrodes 42 when the actuator is in operation. FIG. 18 is calculated using Maxwell.RTM. The attractive force produced is nonlinear with respect to the distance between the fixed and moving electrodes. Hence, when operating the actuator in the attractive mode the actuator of this example operates like a conventional parallel-plate electrostatic actuator and can thus repeatedly achieve a stroke of ⅓ the initial gap distance.

Figure 19:
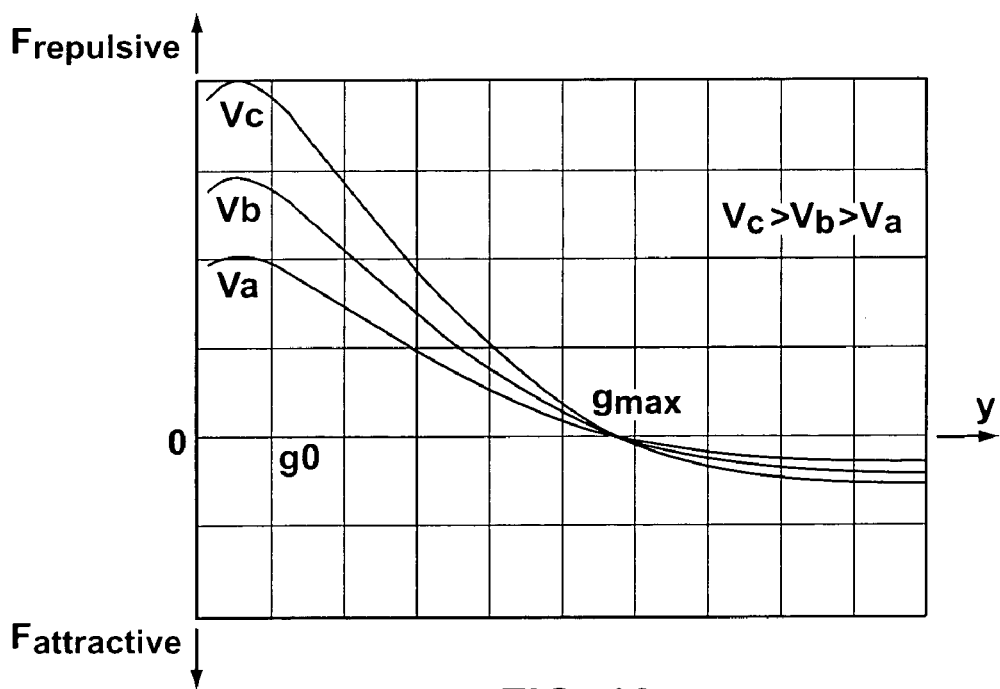
FIG. 19 is a graph illustrating the repulsive force produced in the bi-directional electrostatic actuator of FIG. 15.

The repulsive force generated in the bi-directional actuator of this example is shown in FIG. 19 which is also obtained from numerical simulations using the software package Maxwell. When working in the repulsive mode the actuator of this example can produce a repulsive force over a very large range of the distance between the aligned fixed electrodes on the base and the moving electrodes, i.e., 0-g_max. g_max is the maximum distance between the fixed and moving electrodes, within which the bi-directional actuator can generate a repulsive force. g_max is much larger than the initial gap distance g0. That means the bi-directional actuator of this example working under the repulsive mode can achieve a stroke much larger than the initial gap distance. g_max is determined by structural parameters of the actuator. In this example, g_max is 12 micrometers.

Figure 20:
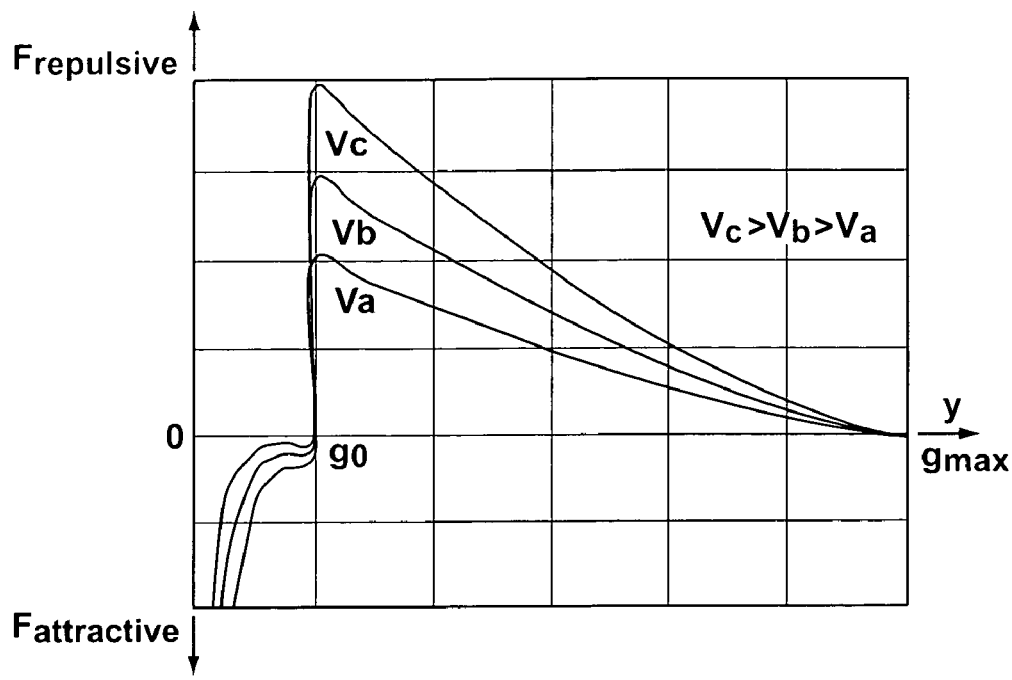
FIG. 20 is a graph illustrating the total force produced in the bi-directional electrostatic actuator of FIG. 15 while in a bi-directional operation mode.

One method of using this electrostatic actuator is in a bidirectional mode of operation. That is, by applying a voltage to the actuator in the attractive mode as shown in FIG. 18 to move the moving electrodes from their static position toward the fixed electrodes and by applying a voltage in the repulsive mode as shown in FIG. 19 to move the moving electrodes from its static position away from the fixed electrodes. FIG. 20 shows the force produced in the bi-directional actuator of this example when operated in both the attractive and repulsive modes.

Figure 21:
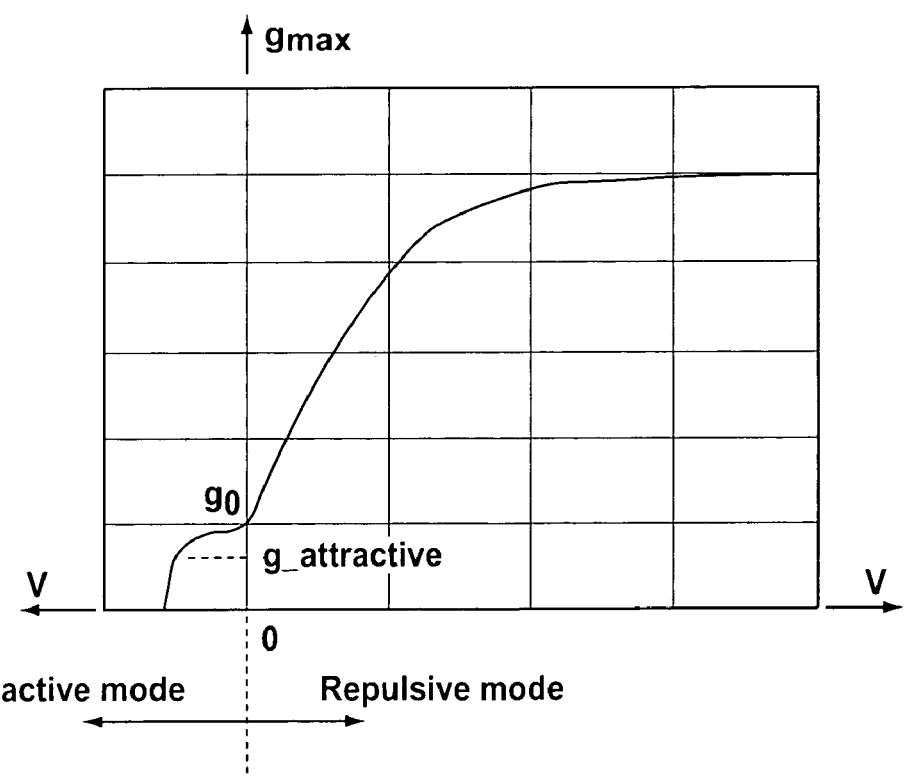
FIG. 21 is a graph illustrating the displacement of the bidirectional electrostatic actuator of FIG. 15 while in a bidirectional operation mode.

FIG. 21 shows the total stroke as g_attractive+g_max. g_attractive is the stroke achieved when working in the attractive mode and is about ⅓ g0.

The bi-directional electrostatic actuator of this example can also function as a unidirectional actuator. The actuator of this example working in the attractive mode can produce a stroke of ⅓ g0. In the repulsive mode it can produce a stroke of g_max.

The bi-directional electrostatic actuators in the above examples can produce an attractive and a repulsive force, and can therefore achieve a bi-directional movement and a large stroke, which is not limited by the initial gap. It requires only two conductive layers and can be easily fabricated by standard surface micromachining technology.

Above, a simplified and generalized arrangement of electrodes was described. The term "aligned" was used to include alignment as well as overlap because exact alignment is not required for the operation of the invention. Also, for ease of understanding, regular arrays of electrodes were described. While regularity is preferred for optimal performance, it is not necessary for operation of the invention. Generally the invention includes: (a) an array of electrodes in a moving element having a corresponding array in a fixed element which contains a set of electrodes that essentially align or overlap those in the moving element, wherein a correspondence of 1:1 is desired but is not essential; and, (b) each of the electrodes in the fixed element described in (a) further has at least one adjacent fixed electrode on each side.

Figure 22A:
FIG. 22 (a) is a section view illustrating the electrodes in the bi-directional electrostatic actuator of FIG. 1 where electrodes in the moving array are essentially aligned with or overlapped by corresponding electrodes in the fixed array, in accordance with an embodiment of the invention.
FIG. 22(b) is a section view illustrating the electrodes in the bi-directional electrostatic actuator of FIG. 1 where the aligned fixed electrodes have more than one adjacent unaligned fixed electrode on each side and where the number of unaligned fixed electrodes could be equal to or larger than 1, in accordance with an embodiment of the invention.
FIG. 22(c) is a section view illustrating the electrodes in the bi-directional electrostatic actuator of FIG. 1 where electrodes in the moving array are essentially but not completely aligned with corresponding electrodes in the fixed array, in accordance with an embodiment of the invention.
Figure 22B:
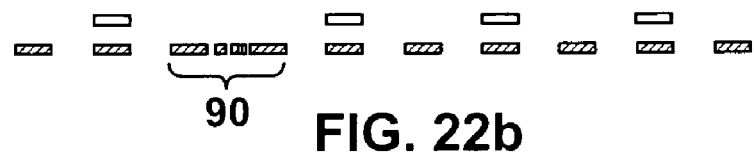
Figure 22C:

To illustrate, FIG. 22 (*a*) shows the configuration of FIG. 1 where electrodes in the moving array are essentially aligned or overlapped by corresponding electrodes in the fixed array. FIG. 22(*b*) shows the configuration of FIG. 1 where the aligned fixed electrodes have more than one adjacent unaligned fixed electrode 90 on each side and where the number of unaligned fixed electrodes 90 could be equal to or larger than 1. And, FIG. 22(*c*) shows the configuration of FIG. 1 where electrodes in the moving array are essentially but not completely aligned with corresponding electrodes in the fixed array.

Figure 23A:
FIG. 23 (a) is a section view illustrating the electrodes in the bi-directional electrostatic actuator of FIG. 15 where electrodes in the moving array are essentially aligned with or overlapped by corresponding electrodes in the fixed array, in accordance with an embodiment of the invention.
Figure 23B:
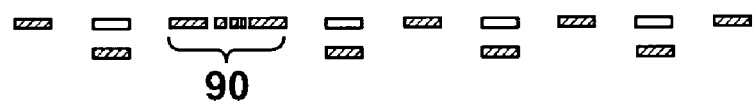
Figure 23C:

In addition, FIG. 23(*a*) shows the configuration of FIG. 15 where electrodes in the moving array are essentially aligned with or overlapped by corresponding electrodes in the fixed array. FIG. 23(*b*) shows the configuration of FIG. 15 where the aligned fixed electrodes have more than one adjacent unaligned fixed electrode 90 on each side and where the number of unaligned fixed electrodes 90 could be equal to or larger than 1. And, FIG. 23(*c*) shows the configuration of FIG. 15 where electrodes in the moving array are essentially but not completely aligned with corresponding electrodes in the fixed array.

Figure 24A:
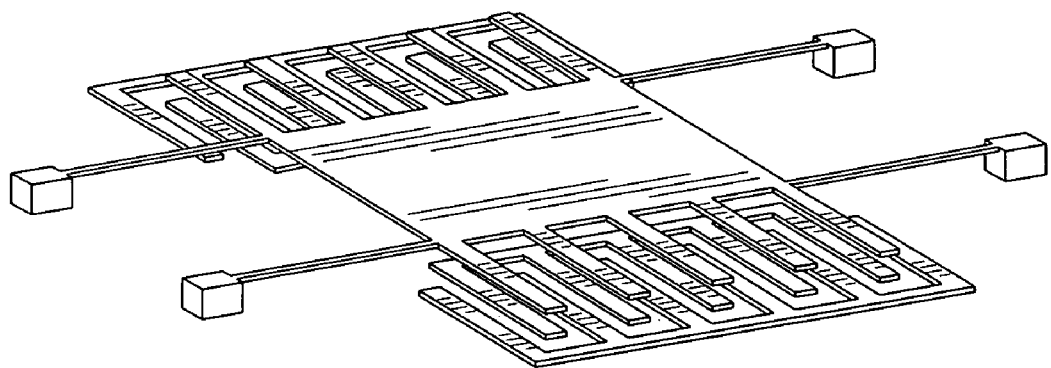
FIG. 24(*a*) is perspective view illustrating a translation micromirror driven by the bi-directional electrostatic actuator of FIG. 1 in accordance with an embodiment of the invention.
Figure 24B:
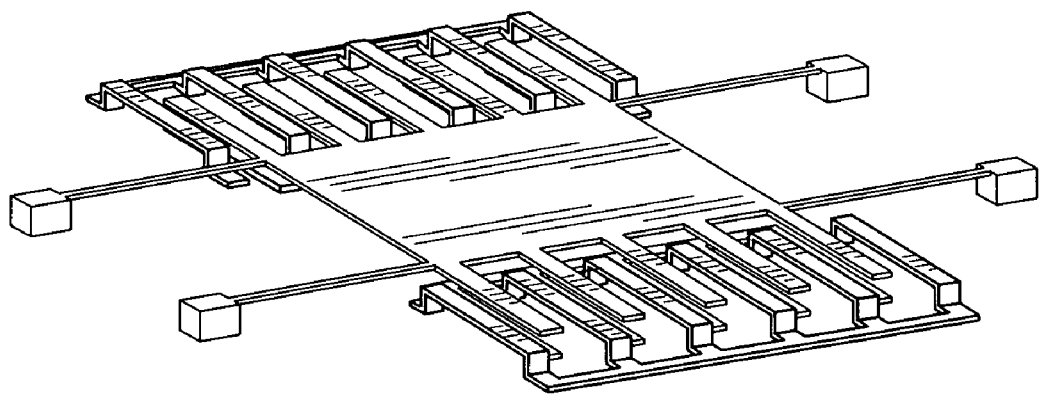

Applications of the Invention. Translation micromirrors as shown in FIGS. 24 (*a*) and 24(*b*) are constructed by using two or four bi-directional electrostatic actuators of either the FIG. 1 or FIG. 15 type. Translation micromirrors based on the present invention can achieve a much larger stroke compared with conventional parallel-plate electrostatic actuators.

Figure 25A:
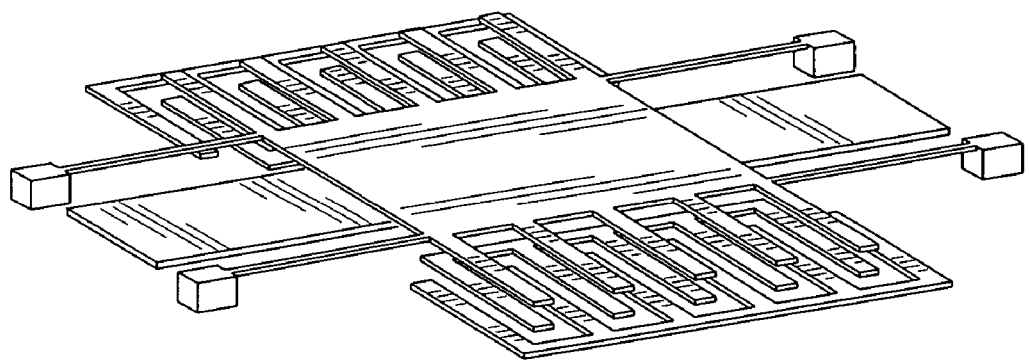
FIG. 25 (*a*) is a perspective view illustrating a RF switch (or RF varactor) driven by the bidirectional electrostatic actuator of FIG. 1 in accordance with an embodiment of the invention.
Figure 25B:
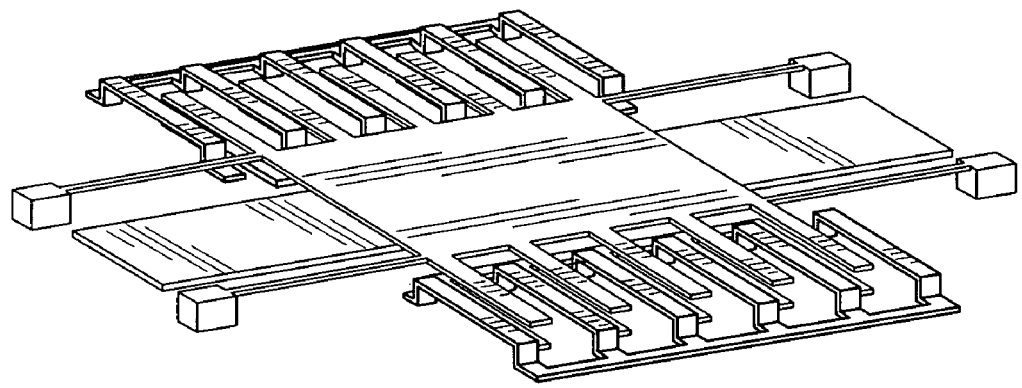

Based on the same design as these translation micromirrors, by adding an electrode or microstrip underneath the minor plate, an RF varactor or RF switch driven by the novel actuators of the present invention is formed, as shown in FIGS. 25(*a*) and 25(*b*). An RF varactor based on the present invention can achieve a tuning ratio larger than 4:1, while conventional parallel-plate actuator based varactors can achieve only 1.5:1.

Figure 26A:
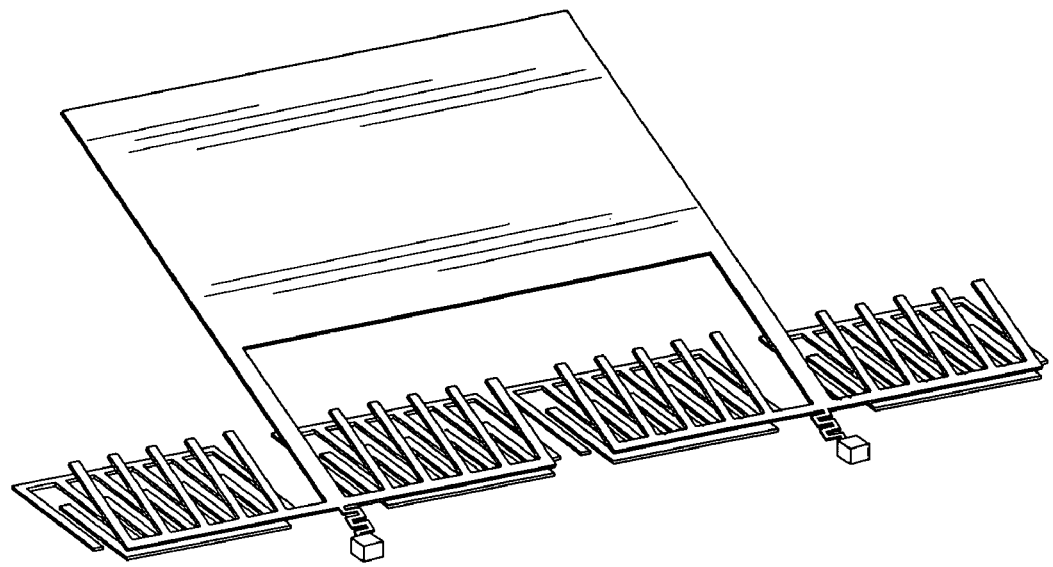
FIG. 26(*a*) is a perspective view illustrating a rotary micromirror driven by the bidirectional electrostatic actuator of FIG. 1 in accordance with an embodiment of the invention.
Figure 26B:
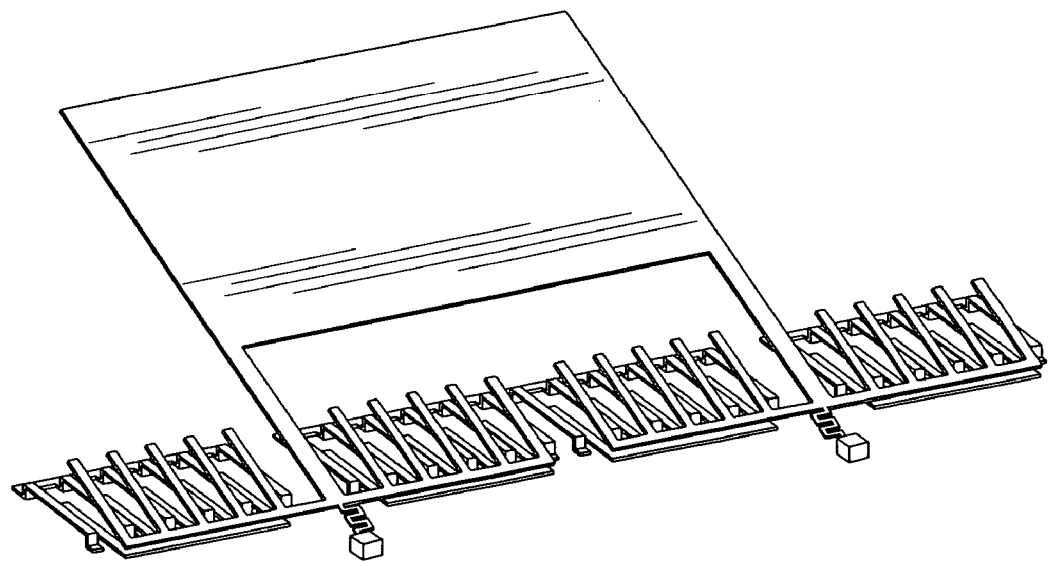
Figure 27A:
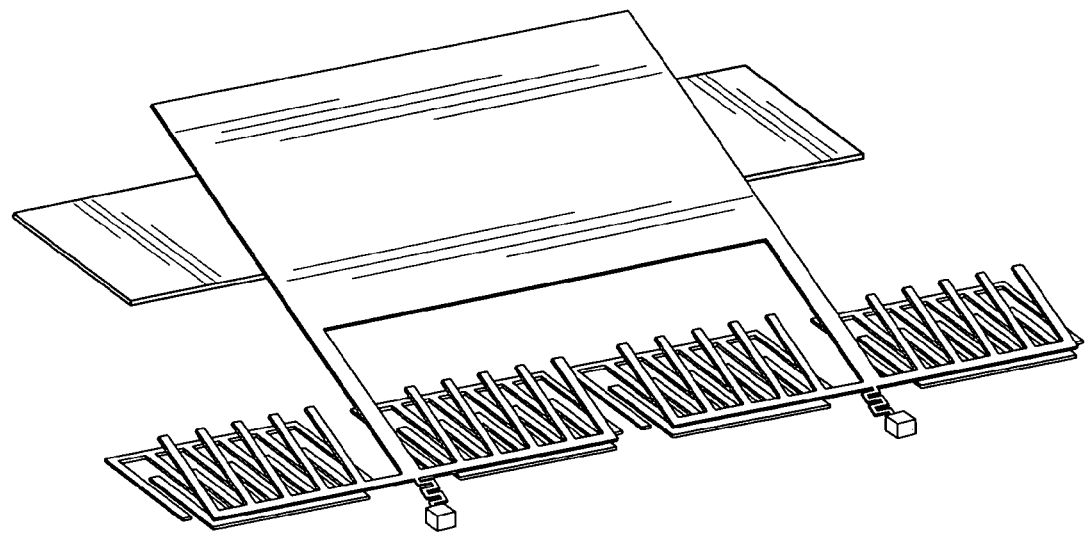
FIG. 27(*a*) is a perspective view illustrating a RF switch (or RF varactor) driven by the bidirectional electrostatic actuator of FIG. 1 in accordance with an embodiment of the invention; and, FIG. 27(*b*) is a perspective view illustrating a RF switch (or RF varactor) driven by the bi-directional electrostatic actuator of FIG. 15 in accordance with an embodiment of the invention.
Figure 27B:
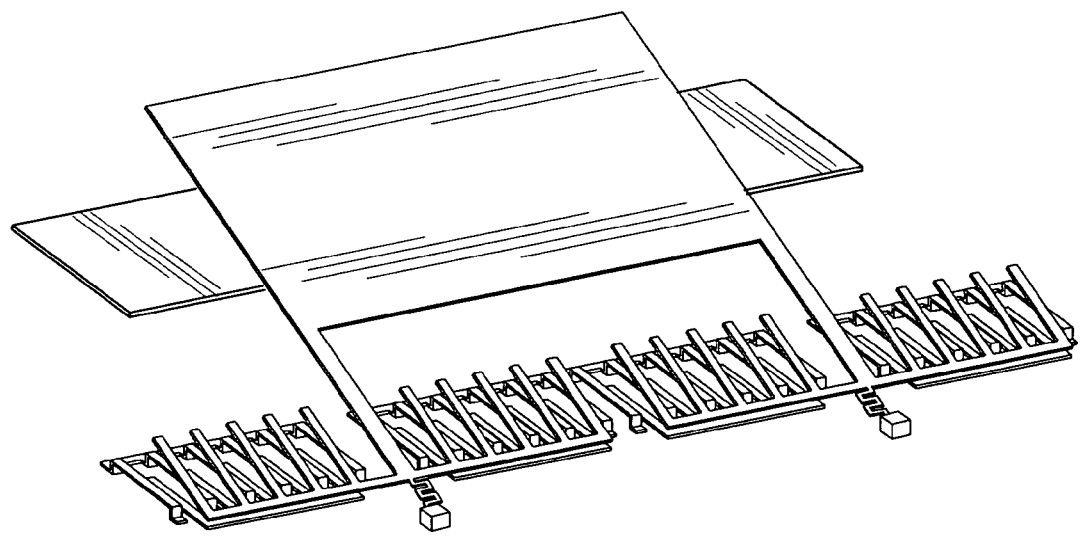

The present invention can also be used to realize rotation to drive either a rotary micromirror as shown in FIGS. 26(*a*) and 26(*b*) or an RF switch (or RF varactor) as shown in FIGS. 27(*a*) and 27(*b*).

The electrostatic actuator of the present invention can also be used to realize 3D rotation by constructing a structure that uses multiple actuators and a multi degree of freedom suspension system.

Another application of the present invention is MEMS programmable nonvolatile memory. MEMS memory devices need two surfaces, which are able to come in contact and then separate even when there is no mechanical restoring force or the mechanical restoring force is very inadequate. Conventional electrostatic actuators provide only an attractive force which can drive the two surfaces to come in contact but can not separate them. The present invention, by providing a bidirectional electrostatic actuator, can provide both attractive force and repulsive force to drive the two surfaces in the MEMS memory to come in contact and then separate.

Although preferred embodiments of the invention have been described herein, it will be understood by those skilled in the art that variations may be made thereto without departing from the spirit of the invention or the scope of the appended claims.

We claim:
1. An electrostatic actuator comprising:
   (a) a base, defining a base plane;
   (b) a plurality of fixed electrodes attached onto the base, having a spacing between two neighboring electrodes;
   (c) a movable element having a plurality of movable electrodes, said movable element defining a movable plane;
   (d) said movable element being elastically positioned at an initial spacing with respect to the base;
   (e) each said electrode having a thickness, a width and a length;
   (f) each movable electrode being directly opposed to and substantially aligned with one fixed electrode, said fixed electrode referred to as aligned fixed electrode;
   (g) each aligned fixed electrode having at least one adjacent fixed electrode unaligned with any moving electrode, said fixed electrode referred to as unaligned fixed electrode;
   (h) voltage source for applying voltage to each of the electrodes;
   (i) said voltage source operable to:
      (i) generate a net repulsive force perpendicular to the base plane by applying a first voltage to all of the movable and the aligned fixed electrodes and a second voltage to the non-aligned fixed electrodes, wherein said first and said second voltages not being equal; or
      (ii) generate a net attractive force perpendicular to the base plane by applying a first voltage to the moving electrodes and a second voltage to all fixed electrodes, wherein said first and said second voltages not being equal.

2. The electrostatic actuator of claim 1, wherein the number of fixed electrodes being at least two times plus one of the number of movable electrodes.

3. The electrostatic actuator of claim 1, wherein said means to elastically connect the movable element to the base allows for a perpendicular motion of the moving element with respect to the base plane.

4. The electrostatic actuator of claim 1, wherein said means to elastically connect the movable element to the base allows for a rotable motion of the moving element with respect to the base plane.

5. The electrostatic actuator of claim 1, wherein all electrodes having substantially the same width.

6. The electrostatic actuator of claim 1, wherein all the moving electrodes being wider than the aligned fixed electrodes and only the moving electrodes and the unaligned fixed electrodes being connected to the voltage sources, whereby providing a unidirectional large stroke attractive actuator.

7. The electrostatic actuator of claim 6, wherein the moving electrodes having a width of about 5 micrometers, the fixed electrodes having a width of about 3 micrometers, and the spacing between two neighboring fixed electrodes being about 3 micrometers, whereby providing an actuator with linear motion.

8. The electrostatic actuator of claim 1, wherein the width of the moving electrodes being smaller than the width of the fixed aligned electrodes, whereby reducing effects of misalignment due to fabrication.

9. The electrostatic actuator of claim 8, wherein the width of the moving electrodes being about 5 micrometers, and the width of the fixed moving electrodes being about 8 micrometers.

10. The electrostatic actuator of claim 9, wherein the spacing between two neighboring fixed electrodes being about 8 micrometers.

11. The electrostatic actuator of claim 1, wherein the thickness of all electrodes being about 1 micrometer.

12. The electrostatic actuator of claim 1, wherein the unaligned fixed electrodes being elevated to a plane other than the base plane.

13. The electrostatic actuator of claim 1, wherein the unaligned fixed electrodes being elevated above the base plane and being disposed in the same plane as the movable plane when no voltage being applied.

14. The electrostatic actuator of claim 13, wherein the initial spacing being about 2 micrometers, the width of the moving electrodes being about 5 micrometers, the width of the fixed electrodes being about 8 micrometers, and the spacing between two neighboring fixed electrodes being about 8 micrometers.

15. The electrostatic actuator of claim 1, wherein all electrodes having an insulation layer and the space between the base and the moveable element being filled with a fluid, whereby providing an actuator operable in a fluid.

16. The electrostatic actuator of claim 1, wherein the base and the moveable element define a space therebetween and the electrostatic actuator further comprises means for providing a vacuum in said space.

17. The electrostatic actuators of claims 1 and 12, wherein the aligned fixed electrodes having more than one adjacent unaligned fixed electrode on each side.

18. The electrostatic actuator of claim 1, wherein said movable element comprising a mirror, whereby providing a large stroke translational micromirror.

19. The electrostatic actuator of claim 1, wherein said movable element comprising a first metal pad and said base further comprising a second metal pad directly underneath of the first metal pad, whereby providing a tunable capacitor with tuning ratio of more than 4 to 1.

20. The electrostatic actuator of claim 1, wherein said movable element having a top surface, a bottom surface and four sides, the two opposite sides of said movable element having movable electrodes, each set of said movable electrodes having corresponding fixed electrodes on the base, said voltage source operable to move or tilt the movable element.

21. A method of operating an electrostatic actuator comprising the steps of:
   (a) providing a base containing a plurality of fixed electrodes, said electrodes referred to as fixed electrodes;
   (b) providing a movable element being movably connected to the base, the moveable element including a plurality of electrodes, said electrodes referred to as moving electrodes;
   (c) each moving electrode having a corresponding aligned fixed electrode on the base, and each aligned fixed electrode on the base being disposed adjacent to at least one non-aligned fixed electrode; and
   (d) a method of applying voltage to said electrodes for generating:
      (i) an out-of-plane (plane perpendicular to the plane containing all the fixed electrodes) repulsive force by applying a first voltage to the moving electrodes on the movable element, a second voltage to the aligned fixed electrodes on the base and a third voltage to the non-aligned fixed electrodes on the base, wherein the first voltage being substantially equal to the second voltage and the third voltage being different than the first and the second voltages; or (ii) an out-of-plane attractive force by applying a first voltage to the moving electrodes on the moveable element, and a second voltage to the aligned and unaligned fixed electrodes, wherein the first and the second voltages not being equal, whereby no insulator layer being required to hold all the moving electrodes since all the moving electrodes being subject to the same potential when either an out-of-plane repulsive force or attractive force being generated, whereby, the moving element, including all moving electrodes, being made of one layer.

22. The method of claim 21, wherein a first voltage applied to the moving electrodes, a second voltage applied to the aligned fixed electrodes, and a third voltage applied to the unaligned fixed electrodes, wherein the first and the second voltages being substantially equal and different from the third voltage, whereby creating an asymmetric field surrounding each of the moving electrodes, and the asymmetric field providing a repulsive electrostatic force that moves the movable electrodes away from the base.

* * * * *